United States Patent
Shionoya

(10) Patent No.: US 9,976,861 B2
(45) Date of Patent: May 22, 2018

(54) NAVIGATION DEVICE

(71) Applicant: Alpine Electronics, Inc., Tokyo (JP)

(72) Inventor: Reiji Shionoya, Fukushima (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 34 days.

(21) Appl. No.: 14/982,727

(22) Filed: Dec. 29, 2015

(65) Prior Publication Data

US 2016/0216124 A1 Jul. 28, 2016

(30) Foreign Application Priority Data

Jan. 28, 2015 (JP) ................. 2015-014032

(51) Int. Cl.
| | |
|---|---|
| G01C 21/34 | (2006.01) |
| G01C 21/30 | (2006.01) |
| G01S 19/39 | (2010.01) |
| G01S 19/50 | (2010.01) |

(52) U.S. Cl.
CPC ............. G01C 21/34 (2013.01); G01C 21/30 (2013.01); G01S 19/39 (2013.01); G01S 19/50 (2013.01)

(58) Field of Classification Search
CPC ........ G01C 21/20; G01C 21/34; G01C 21/32; G01C 21/3415; G01C 21/3476; G01C 21/3484; G01C 21/36; G01C 21/3617; G01C 21/367; G01C 21/3682; G01C 21/3691; G01C 21/3694; G01S 19/13; G01S 19/07; G08G 1/096827; G08G 1/0969; G08G 1/096811; G08G 1/096838; G08G 1/096844; G08G 1/096883; G03B 17/561; G09B 29/00; H04N 5/232; H04N 5/23203; H04N 5/23216; H04N 5/23296
USPC ....... 701/117, 412, 418, 426, 430, 431, 434, 701/532, 533, 534, 538; 702/104; 719/318; 709/220; 382/104;
(Continued)

(56) References Cited

U.S. PATENT DOCUMENTS

| | | | | |
|---|---|---|---|---|
| 6,502,033 | B1 * | 12/2002 | Phuyal ................ | G01C 21/30 340/988 |
| 7,640,102 | B2 * | 12/2009 | Jung .................... | G01C 21/26 342/357.59 |

(Continued)

FOREIGN PATENT DOCUMENTS

JP 07-311048 11/1995

Primary Examiner — Anne M Antonucci
Assistant Examiner — Sanjeev Malhotra
(74) Attorney, Agent, or Firm — Brinks Gilson and Lione

(57) ABSTRACT

A current location measured by a GPS receiver is defined as a base location. Individual points fairly near to the base location that are located on roads whose distances from the base location fall within a predetermined distance are set as candidate points. A distance between the base location and a candidate point to be evaluated is calculated. In a case where the distance is larger than a threshold value statistically estimated from a history of calculated distances between the base location and previously set candidate points that draw a trajectory on a road leading to the candidate point to be evaluated, the threshold value defining a rough upper limit of a distribution range of distances between the base location and the candidate points, it is judged that a true current location is not located on the road in which the candidate point is located.

4 Claims, 7 Drawing Sheets

(58) Field of Classification Search
USPC .............. 340/995.19; 348/46, 211.4, 211.99;
345/419, 633; 342/357.44, 357.51
See application file for complete search history.

(56) References Cited

U.S. PATENT DOCUMENTS

| | | | | |
|---|---|---|---|---|
| 8,131,460 B2* | 3/2012 | Severson | ........... | G01C 21/3611 340/995.19 |
| 8,914,224 B2* | 12/2014 | Geelen | ................ | G01C 21/367 701/117 |
| 2007/0143009 A1* | 6/2007 | Nomura | ............. | G01C 21/3647 701/532 |
| 2009/0125916 A1* | 5/2009 | Lu | .......................... | G06Q 10/04 719/318 |
| 2009/0228208 A1* | 9/2009 | Yang | ...................... | G01C 21/20 701/431 |
| 2009/0245583 A1* | 10/2009 | Fukumoto | .............. | G01C 21/26 382/104 |
| 2010/0153004 A1* | 6/2010 | Natsume | ................ | G01C 21/20 701/533 |
| 2010/0268453 A1* | 10/2010 | Otani | ................. | G01C 21/3629 701/533 |
| 2011/0082637 A1* | 4/2011 | Green | ................. | G01C 21/3476 701/532 |
| 2012/0072110 A1* | 3/2012 | Venkatraman | ........... | G01C 5/06 701/434 |
| 2012/0130638 A1* | 5/2012 | Uyama | ................... | G01C 21/34 701/533 |
| 2012/0233297 A1* | 9/2012 | Chen | ...................... | G06Q 20/10 709/220 |
| 2013/0076860 A1* | 3/2013 | Liu | ........................ | G06T 15/205 348/46 |
| 2013/0262013 A1* | 10/2013 | Ide | ........................... | G01S 19/34 702/104 |
| 2014/0009632 A1* | 1/2014 | Glover | .................. | H04N 5/232 348/211.99 |
| 2014/0055448 A1* | 2/2014 | Teixeira | ................ | G06F 19/321 345/419 |
| 2014/0347217 A1* | 11/2014 | McClure | ................ | G01S 19/07 342/357.51 |
| 2015/0116358 A1* | 4/2015 | Choi | ........................ | G06T 9/00 345/633 |
| 2015/0195451 A1* | 7/2015 | Glover | .................. | H04N 5/232 348/211.4 |
| 2015/0253147 A1* | 9/2015 | Gruijters | ................ | G01C 21/32 701/418 |
| 2015/0354968 A1* | 12/2015 | Mizuno | ................ | G09B 29/106 701/534 |
| 2016/0025497 A1* | 1/2016 | Baalu | ................... | G01C 21/005 701/430 |
| 2016/0047668 A1* | 2/2016 | Sano | ................... | G01C 21/3492 701/412 |
| 2016/0091335 A1* | 3/2016 | Bhatt | ................ | G01C 21/3484 701/538 |
| 2016/0097649 A1* | 4/2016 | Broadbent | ......... | G01C 21/3691 701/426 |
| 2016/0154108 A1* | 6/2016 | McClure | ................ | G01S 19/07 342/357.44 |

* cited by examiner

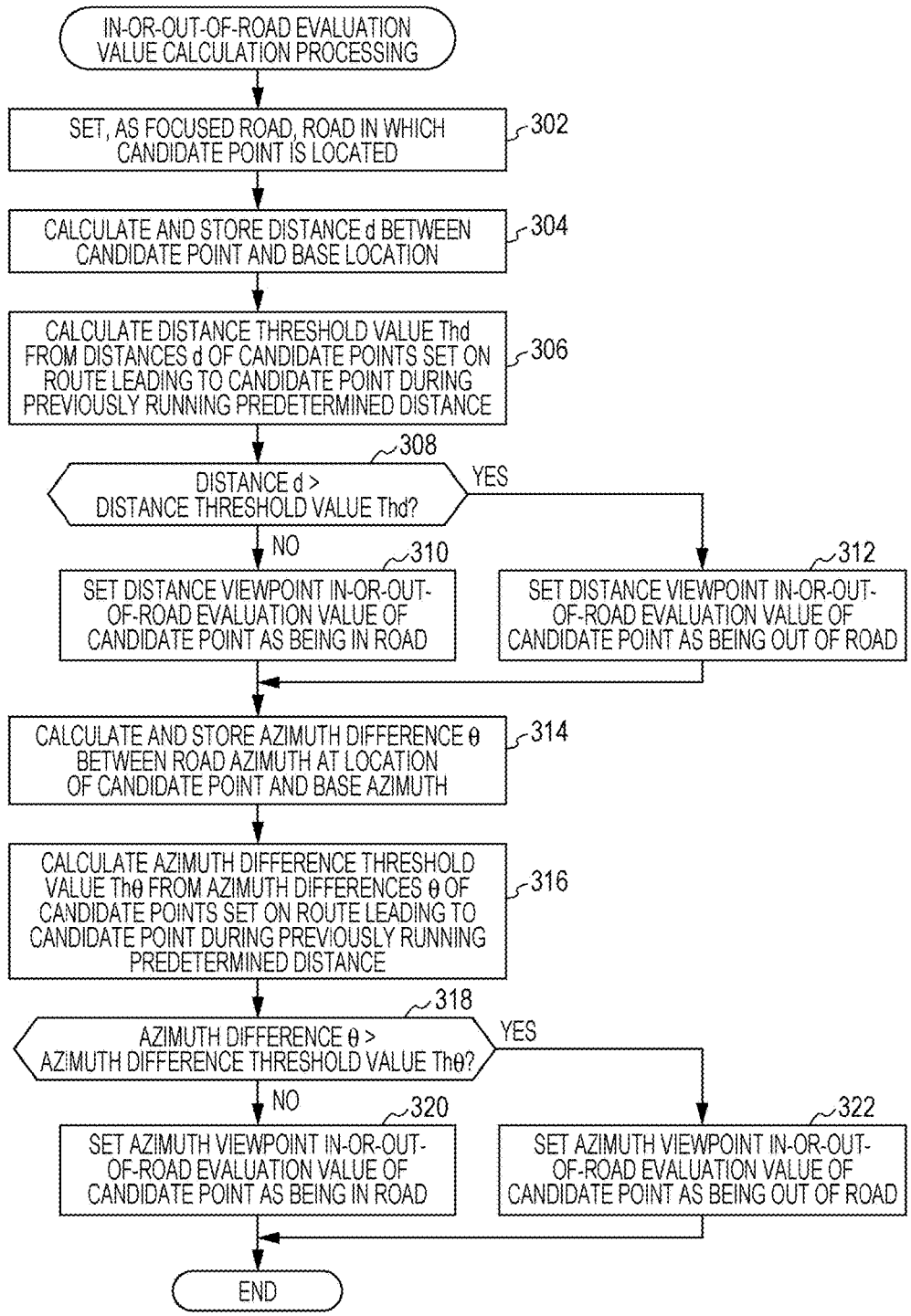

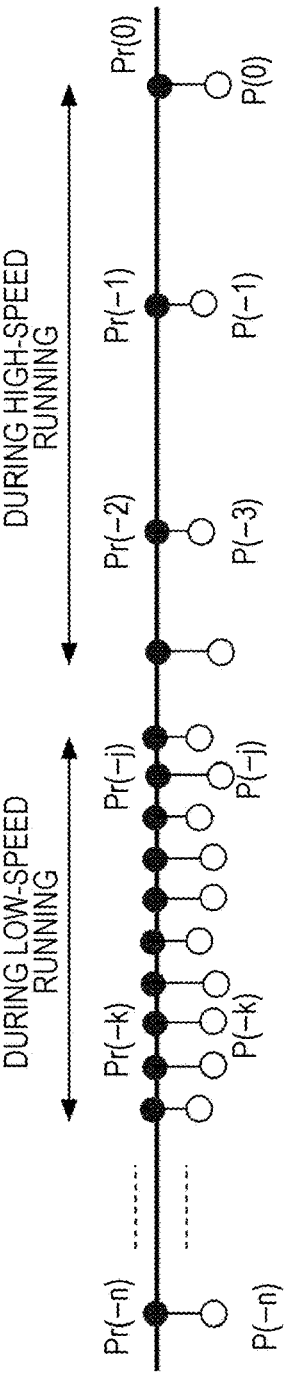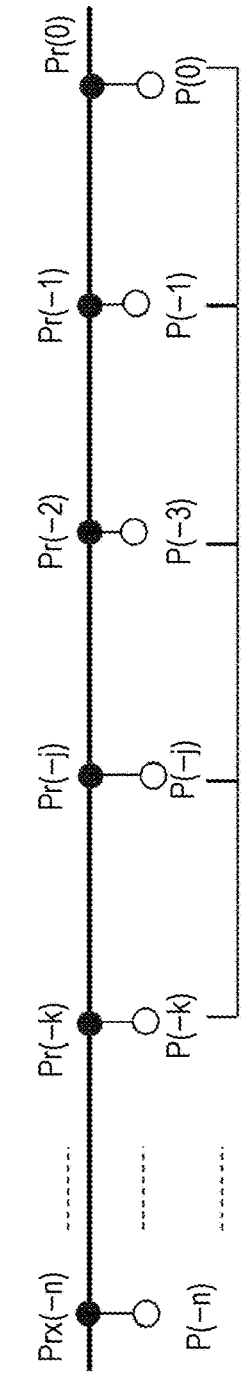
FIG. 5A
FIG. 5B

NAVIGATION DEVICE

RELATED APPLICATION

The present application claims priority to Japanese Patent Application Number 2015-014032, filed on Jan. 28, 2015, the entirety of which is hereby incorporated by reference.

BACKGROUND

1. Field

The present disclosure relates to a technology for calculating a current location in a navigation device by using map matching.

2. Description of the Related Art

In the technology for calculating a current location in a navigation device by using map matching, there has been known a technology that: i) defines, as a base location, a current location measured by a GPS receiver, or a current location calculated by dead reckoning navigation utilizing a sensor that detects a running distance or a traveling azimuth; ii) defines, as candidate points, locations on respective roads in the vicinity of the base location, the locations being fairly near to the base location, and, iii) selects a point to be defined as a current location from among candidate points whose distances from the base location fall within a predetermined threshold value (see, for example, Japanese Unexamined Patent Application Publication No. 07-311048).

SUMMARY

In a case where the above-mentioned technology for selecting a point to be defined as the current location from among the candidate points whose distances from the base location fall within the predetermined threshold value is applied to a navigation application whose operating environment is based on an assumption of various types of mobile devices, the following problem may occur.

For example, a measurement characteristic of a GPS receiver or a sensor, such as a measurement error, varies according to each of the types of mobile device. Therefore, an adequate value of a threshold value used for selecting a point to be defined as a current location from among candidate points varies according to each of the types of mobile devices.

Accordingly, if the threshold value is preliminarily defined in such a manner as in the above-mentioned technology, it may be difficult to adequately select candidate points to be defined as selection targets of the current location. Examples include a case where, depending on a combination of the value thereof and the type of mobile device, a candidate point on a road in which the true current location is located is excluded from the selection targets of the current location. In addition, in such a case, as a result, it becomes difficult to correctly calculate the current location.

Accordingly, it is an object of the present disclosure to correctly calculate a current location, in a navigation device that calculates the current location by using map matching, while not depending on a difference between measurement devices, such as a GPS receiver and a sensor, which measure a location of the navigation device.

Accordingly, it is an object of the present disclosure to provide a navigation device that measures a location of the device itself, the navigation device including: a referenced-point setting unit configured to repeatedly perform processing for i) setting, as a base location, a measured current location of the navigation device, ii) referencing map data expressing a map, and iii) setting, as a referenced point, a point located on a road in the vicinity of the base location and fairly near to the base location; and an out-of-road determination unit configured to determine, each time the referenced point is set, whether a current location is located out of a road in which the referenced point is set. In this regard, the out-of-road determination unit i) calculates, each time the referenced point is set, an evaluation target correlation value indicating a magnitude of a correlation between the current base location and the current referenced point; ii) defines, as a focused referenced point, each of the previously set referenced points in which a trajectory obtained by connecting the previously set referenced points and the current referenced point in order of setting of the referenced points follows a trajectory on a road leading to the current referenced point; iii) statistically obtains, from a history of evaluation target correlation values individually calculated for the respective focused referenced points, a value of a boundary of a distribution range including most of the evaluation target correlation values under the assumption that the evaluation target correlation values within the history are distributed in accordance with a predetermined distribution model; iv) the out-of-road determination unit sets the obtained value of the boundary as a threshold value and determines whether the evaluation target correlation value calculated for the current referenced point shows a correlation smaller than the threshold value; v) determines that the current location is located out of the road in which the current referenced point is set, in a case of showing a smaller correlation; and, vi) does not determine that the current location is located out of the road in which the current referenced point is set, in a case of not showing a smaller correlation.

Here, in such a navigation device, for example, a distance between the current base location and the current referenced point may be used as the evaluation target correlation value.

In addition, it is an object of the present disclosure to provide a navigation device that measures a location and a traveling azimuth of the device itself, the navigation device including: a referenced-point setting unit configured to repeatedly perform processing for i) setting, as a base location, a measured current location of the navigation device, ii) setting, as a base azimuth, a measured current traveling azimuth of the navigation device, iii) referencing map data expressing a map, and iv) setting, as a referenced point, a point located on a road in the vicinity of the base location and fairly near to the base location; and, an out-of-road determination unit configured to determine, each time the referenced point is set, whether a current location is located out of a road in which the referenced point is set. In this regard, the out-of-road determination unit: i) calculates, each time the referenced point is set, an evaluation target correlation value indicating a magnitude of a correlation between the current base azimuth and an azimuth of a road at the current referenced point; ii) defines, as a focused referenced point, each of the previously set referenced points in which a trajectory obtained by connecting the previously set referenced points and the current referenced point in order of setting of the referenced points follows a trajectory on a road leading to the current referenced point; iii) statistically obtains, from a history of evaluation target correlation values individually calculated for the respective focused referenced points, a value of a boundary of a distribution range including most of the evaluation target correlation values under the assumption that the evaluation target correlation values within the history are distributed in accordance with a predetermined distribution model; iv) sets the obtained value of the boundary as a threshold value and determines whether the evaluation target correlation value calculated for the current referenced point shows a correlation smaller than the threshold value; v) determines that the current location is located out of the road in which the current referenced point is set, in a case of showing a smaller correlation; and, iv) does not determine that the current location is located out of the road in which the current referenced point is set, in a case of not showing a smaller correlation.

Here, in this navigation device, for example, a difference between the current base azimuth and the azimuth of the road at the current referenced point may be used as the evaluation target correlation value.

In addition, the above-mentioned navigation device may be configured so that a referenced point set during a time period in which the navigation device previously moved a predetermined distance is defined as the focused referenced point, from among previously set referenced points in which a trajectory obtained by connecting the previously set referenced points and the current referenced point in order of setting of the referenced points follows a trajectory on a road leading to the current referenced point.

In addition, it is an object of the present disclosure to provide a navigation device that repeatedly performs processing for measuring a location of the device itself and calculating, based on the measured location, a current location, the navigation device including: a candidate point setting unit configured to i) set, as a base location, a measured current location of the navigation device, ii) reference map data expressing a map, and iii) set, as a candidate point, a point located on each road in the vicinity of the base location and fairly near to the base location each time the current location is calculated; a current location calculation unit configured to calculate, as the current location, a candidate point, at which a likelihood of serving as a true current location is a maximum, in accordance with an evaluation result obtained by evaluating, with respect to evaluation values, a probability that each of the candidate points to be evaluated serves as the true current location each time the current location is calculated; and an out-of-road determination unit. The evaluation values include an in-or-out-of-road evaluation value calculated by the out-of-road determination unit. In addition, the out-of-road determination unit: i) calculates, each time the current location is calculated, an evaluation target correlation value indicating a magnitude of a correlation between the current base location and the candidate point to be evaluated; ii) defines, as a focused candidate point, each of the previously set candidate points in which a trajectory obtained by connecting the previously set candidate points and the candidate point to be evaluated in order of setting of the candidate points follows a trajectory on a road leading to the candidate point to be evaluated; iii) statistically obtains, from a history of evaluation target correlation values individually calculated for the respective focused candidate points, a value of a boundary of a distribution range including most of the evaluation target correlation values under the assumption that the evaluation target correlation values within the history are distributed in accordance with a predetermined distribution model; iv) sets the obtained value of the boundary as a threshold value and determines whether the evaluation target correlation value calculated for the candidate point to be evaluated shows a correlation smaller than the threshold value; v) calculates, as a value of the in-or-out-of-road evaluation value of the candidate point to be evaluated, a value indicating that the current location is located out of the road in which the candidate point is set, in a case of showing a smaller correlation; and, vi) calculates, as the value of the in-or-out-of-road evaluation value of the candidate point to be evaluated, a value indicating that the current location is likely to be located on the road in which the candidate point is set, in a case of not showing a smaller correlation. In addition, in a case where the value of the in-or-out-of-road evaluation value indicates that the current location is likely to be located on the road in which the candidate point is set, the in-or-out-of-road evaluation value indicates that it is probable that the candidate point serves as the true current location, compared with a case where the value indicates that the current location is located out of the road in which the candidate point is set.

Here, in this navigation device, for example, a distance between the current base location and the candidate point to be evaluated may be used as the evaluation target correlation value.

In addition, it is an object of the present disclosure to provide a navigation device that repeatedly performs processing for measuring a location and a traveling azimuth of the device itself and calculating, based on the measured location and traveling azimuth, a current location, the navigation device including: a candidate point setting unit configured to i) set, as a base location, a measured current location of the navigation device, ii) to set, as a base azimuth, a measured current traveling azimuth of the navigation device, iii) to reference map data expressing a map, and iv) to set, as a candidate point, a point located on each road in the vicinity of the base location and fairly near to the base location each time the current location is calculated; a current location calculation unit configured to calculate, as the current location, a candidate point, at which a likelihood of serving as a current location is a maximum, in accordance with an evaluation result obtained by evaluating, with respect to evaluation values, a probability that each of the candidate points to be evaluated serves as the true current location each time the current location is calculated; and, an out-of-road determination unit. In this regard, the evaluation values include an in-or-out-of-road evaluation value calculated by the out-of-road determination unit. The out-of-road determination unit: i) calculates, each time the current location is calculated, an evaluation target correlation value indicating a magnitude of a correlation between the current base azimuth and an azimuth of a road at the candidate point to be evaluated; ii) defines, as a focused candidate point, each of previously set candidate points in which a trajectory obtained by connecting the previously set candidate points and the candidate point to be evaluated in order of setting of the candidate points follows a trajectory on a road leading to the candidate point to be evaluated; iii) statistically obtains, from a history of evaluation target correlation values individually calculated for the respective focused candidate points, a value of a boundary of a distribution range including most of the evaluation target correlation values under the assumption that the evaluation target correlation values within the history are distributed in accordance with a predetermined distribution model; iv) sets the obtained value of the boundary as a threshold value and determines whether the evaluation target correlation value calculated for the candidate point to be evaluated shows a correlation smaller than the threshold value; v) calculates, as a value of the in-or-out-of-road evaluation value of the candidate point to be evaluated, a value indicating that the current location is located out of the road in which the candidate point is set, in a case of showing a smaller correlation; and, vi) calculates, as the value of the in-or-out-of-road evaluation value of the candidate point to be evaluated, a value indicating that the current location is likely to be located on the road in which the candidate point is set, in a case of not showing a smaller correlation. In a case where the value of the in-or-out-of-road evaluation value indicates that the current location is likely to be located on the road in which the candidate point is set, the in-or-out-of-road evaluation value indicates that it is probable that the candidate point serves as the true current location, compared with a case where the value indicates that the current location is located out of the road in which the candidate point is set.

Here, in this navigation device, for example, a difference between the current base azimuth and the azimuth of the road at the referenced point to be evaluated may be used as the evaluation target correlation value.

Here, in the above-mentioned navigation device, a candidate point set during a time period in which the navigation device previously moved a predetermined distance may be defined as the focused candidate point, from among previously set candidate points in which a trajectory obtained by connecting the previously set candidate points and the candidate point to be evaluated in order of setting of the candidate points follows a trajectory on a road leading to the candidate point to be evaluated.

In addition, in the above-mentioned navigation device, the measured location of the navigation device may be a location of the navigation device, measured by, for example, a GPS receiver.

In such a navigation device described above, a magnitude of a correlation between the measured base location and a location on a road in the vicinity of the base location or a magnitude of a correlation between the measured base azimuth and a road azimuth on a road in the vicinity of the base location is used as the evaluation target correlation value. The value of the boundary of the distribution range including most of the evaluation target correlation values in a case where the evaluation target correlation values are distributed in accordance with a predetermined distribution model is calculated and set as the threshold value, based on the history of the evaluation target correlation values. Depending on whether the evaluation target correlation value is smaller than the threshold value, it is judged that the current location is located out of the road. According to such a navigation device as described above, a distribution model followed by the distribution of the evaluation target correlation values in a case where the current location is located on the road is set as the predetermined distribution model. Accordingly, regardless of the type of measurement device that measures the base location or the base azimuth, it becomes possible to adequately judge whether the base location is located out of a road in the vicinity of the base location.

As described above, according to the present disclosure, it is possible to correctly calculate a current location, in a navigation device that calculates the current location by using map matching, while not depending on a difference between measurement devices such as a GPS receiver and a sensor, which measure a location of the navigation device.

BRIEF DESCRIPTION OF THE DRAWINGS

FIG. 3 is a flowchart illustrating in-or-out-of-road evaluation value calculation processing according to an embodiment of the present disclosure;

FIGS. 5A and 5B are diagrams each illustrating a processing example of the in-or-out-of-road evaluation value calculation processing according to an embodiment of the present disclosure;

DESCRIPTION OF THE PREFERRED EMBODIMENTS

Hereinafter, an embodiment of the present disclosure will be described by taking, as an example, application to a navigation application loaded into a mobile device.

Figure 1:
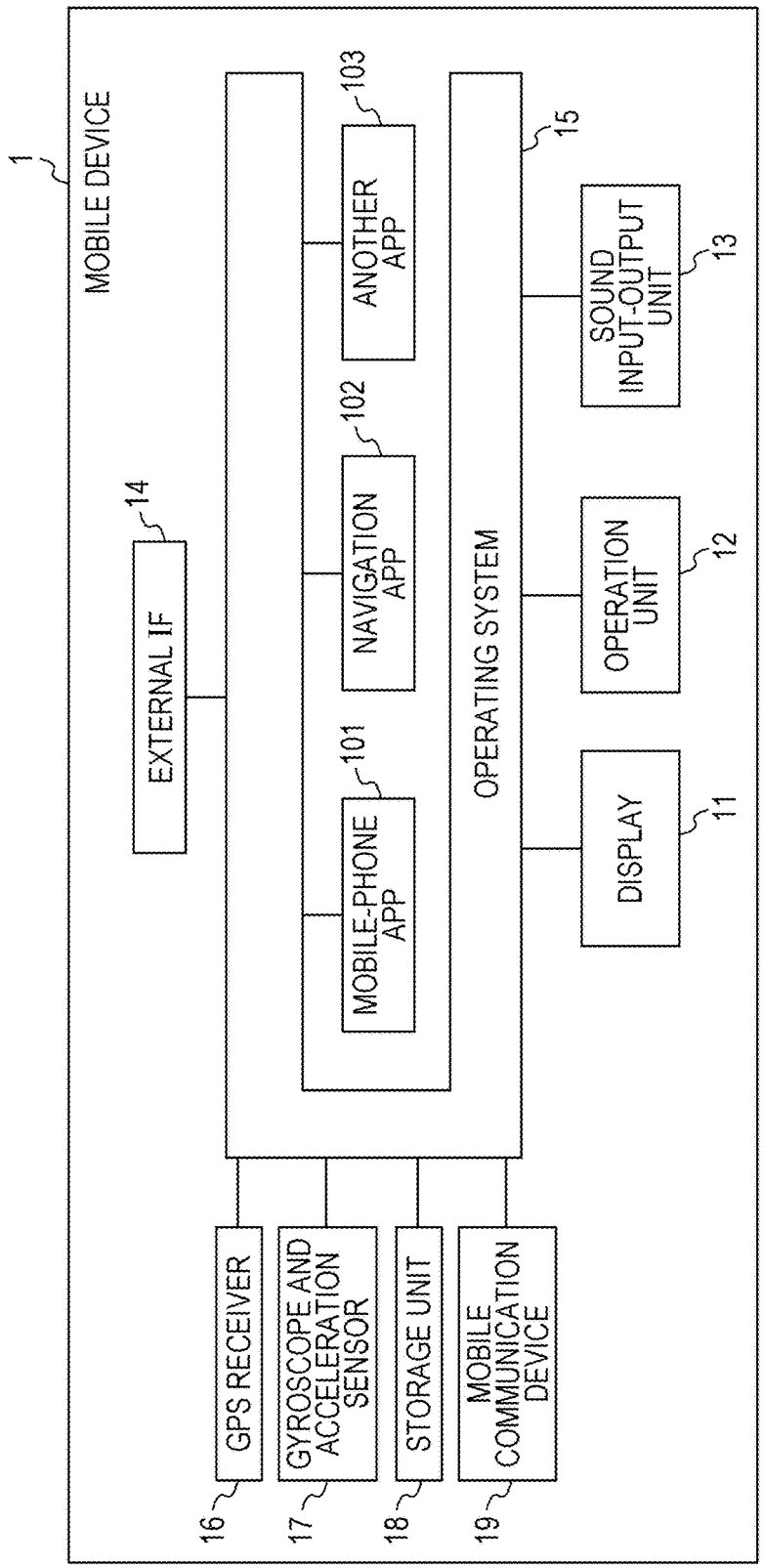
FIG. 1 is a block diagram illustrating a configuration of a mobile device according to an embodiment of the present disclosure.

FIG. 1 illustrates a configuration of a mobile device according to a first embodiment of the present disclosure.

A mobile device 1 is a portable device such as a smartphone or a tablet device, carried by a user, and includes, as illustrated in a drawing, a display 11, an operation unit 12, a sound input-output unit 13 equipped with a microphone, a speaker, and so forth, an external interface 14 such as Bluetooth (registered trademark) or Wi-Fi, an operating system 15, applications, which are controlled by the operating system 15 and operate on the operating system 15, a GPS receiver 16, a gyroscope and acceleration sensor 17, a storage unit 18 for storing therein map data, and a mobile communication device 19 for connecting to a mobile-phone network.

In addition, as the above-mentioned applications, the mobile device 1 includes a mobile-phone application 101 for providing a mobile-phone function that utilizes the mobile communication device 19, the sound input-output unit 13, and the operation unit 12, a navigation application 102 for providing a navigation function, and another application 103.

In this regard, however, in terms of hardware, the mobile device 1 is configured by a computer equipped with a CPU, a memory, and so forth, and the relevant computer may execute a predetermined computer program, thereby realizing the operating system 15, the individual applications, and so forth.

And now, in such a configuration, the navigation application 102 in the mobile device 1 periodically calculates a base location and a current base azimuth by using the GPS receiver 16 and the gyroscope and acceleration sensor 17. Here, a current location subjected to satellite positioning by using, for example, the GPS receiver 16 is defined as a base location, thereby performing the calculation of the base location. In addition, a current traveling azimuth subjected to satellite positioning by using the GPS receiver 16 is defined as a base azimuth or a current traveling azimuth obtained from a detection value of the gyroscope and acceleration sensor 17 is defined as a base azimuth, thereby performing the calculation of the base azimuth.

In addition, the navigation application 102 performs map matching processing between the base location and base azimuth and map data stored in the storage unit 18 and calculates the current location and the current traveling azimuth.

In addition, the navigation application 102 searches for a route to a destination set by a user and performs processing for setting the route as a guidance route.

In addition, the navigation application 102 performs navigation screen display processing for generating a navigation screen that illustrates, on a map expressed by the map data, a current location mark for indicating the current location and a current traveling direction, the route to the destination, and a button object used for receiving a user operation, thereby displaying the navigation screen on the display 11.

Figure 2:
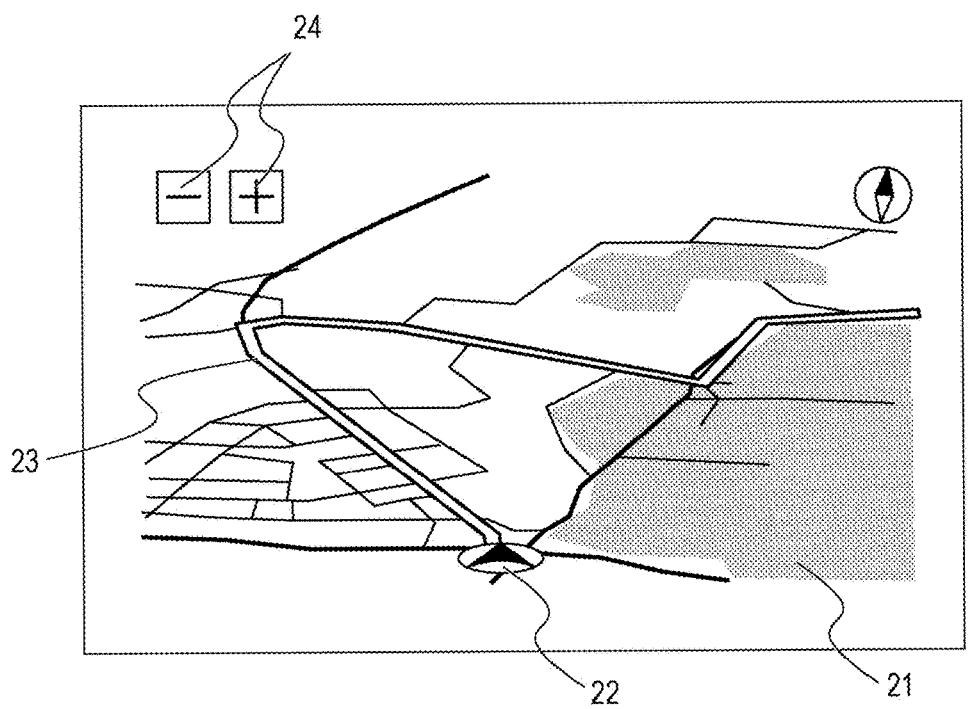
FIG. 2 is a diagram illustrating an example of a display screen of a navigation application according to an embodiment of the present disclosure.

Here, FIG. 2 illustrates an example of the navigation screen generated and displayed, in such a manner, by the navigation application 102 by using the navigation screen display processing.

As illustrated in the drawing, on a map 21 displayed with the base azimuth as an upper direction, a navigation screen image illustrates a current location mark 22 for indicating the current location, a route 23 to the destination, and button objects 24 used for receiving user operations.

Hereinafter, the map matching processing performed by the navigation application 102 as described above will be described by taking, as an example, a case where a user uses the mobile device 1 in an automobile.

Individual points fairly near to a base location and located on individual roads whose distances from the base location fall within a predetermined distance are set as candidate points. Evaluation values indicating probabilities that the respective candidate points serve as the current location are calculated for the respective candidate points. When a candidate point at which an evaluation of a probability that the relevant candidate point serves as the current location is a maximum, the evaluation of a probability being based on the corresponding evaluation value, it is calculated as the current location, thereby performing the map matching processing.

Here, the evaluation value of each of the candidate points is calculated by comprehensively evaluating evaluation elements.

Figure 4A:
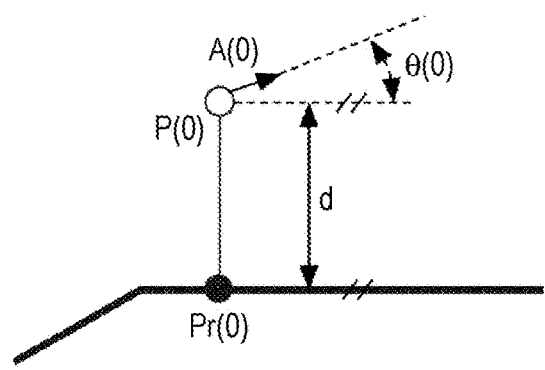
FIGS. 4A to 4C are diagrams each illustrating a processing example of the in-or-out-of-road evaluation value calculation processing according to an embodiment of the present disclosure.

Here, as illustrated in FIG. 4A, a distance d between a current base location (i.e., at this time) and a candidate point Pr(0) serving as an evaluation target, an azimuth difference $\theta 1$ between a current base azimuth A(0) (i.e., at this time) and an azimuth in the location of the candidate point Pr(0) on a road in which the candidate point Pr(0) serving as an evaluation target is located, a distance viewpoint in-or-out-of-road evaluation value (to be described later), an azimuth viewpoint in-or-out-of-road evaluation value to be described later, and so forth are used as the evaluation elements.

Note that the evaluation of the distance d serving as one of the evaluation elements is performed by evaluating that a probability of serving as the current location increases with a decrease in the distance d of a candidate point and the evaluation of the azimuth difference $\theta 1$ serving as one of the evaluation elements is performed by evaluating that a probability of serving as the current location increases with a decrease in the azimuth difference $\theta 1$ of a candidate point.

In addition, the distance viewpoint in-or-out-of-road evaluation value and the azimuth viewpoint in-or-out-of-road evaluation value each indicate whether there is a possibility that a candidate point is a point on a road on which the current location is located. In a case where these evaluation values each indicate that there is a possibility that the candidate point is a point on a road on which the current location is located, that the candidate point is the current location is evaluated. In addition, in a case where these evaluation values each indicate that the candidate point is not a point on a road in which the current location is located, that the candidate point is not the current location is evaluated. Accordingly, the evaluations of the distance viewpoint in-or-out-of-road evaluation value and the azimuth viewpoint in-or-out-of-road evaluation value are performed. Alternatively, in a case where these evaluation values each indicate that there is a possibility that the candidate point is a point on a road on which the current location is located, that a probability of the candidate point serving as the current location is high is evaluated. In addition, in a case where these evaluation values each indicate that the candidate point is not a point on a road on which the current location is located, that a probability of the candidate point serving as the current location is low is evaluated. Accordingly, the evaluations of the distance viewpoint in-or-out-of-road evaluation value and the azimuth viewpoint in-or-out-of-road evaluation value are performed.

Hereinafter, in-or-out-of-road evaluation value calculation processing performed, in such a configuration, by the navigation application 102 in order to calculate the distance viewpoint in-or-out-of-road evaluation value and the azimuth viewpoint in-or-out-of-road evaluation value, described above, for each of set candidate points will be described.

FIG. 3 illustrates a procedure of the in-or-out-of-road evaluation value calculation processing.

Note that the in-or-out-of-road evaluation value calculation processing is performed for each of the set candidate points serving as targets.

As illustrated in the drawing, in this processing, first a road on which a candidate point is located is set as a focused road (step 302).

In addition, such a distance d illustrated in FIG. 4A between a current base location P(0) and the candidate point Pr(0) to be evaluated is calculated and stored (step 304).

In addition, a group of previously set candidate points (i.e., set last time and therebefore) set on a route leading to the candidate point to be evaluated during a previously moved predetermined distance (for example, 300 m) is calculated, and a distance threshold value Thd is calculated from the distance d calculated and set for each of the candidate points within the calculated group (step 306).

Here, the group of candidate points set on a route leading to the candidate point to be evaluated during the previously moved predetermined distance is a group of candidate points in which a trajectory obtained by connecting candidate points within the set and the candidate point to be evaluated in order of setting of the candidate points draws a trajectory on the road leading to the candidate point to be evaluated.

Figure 4B:
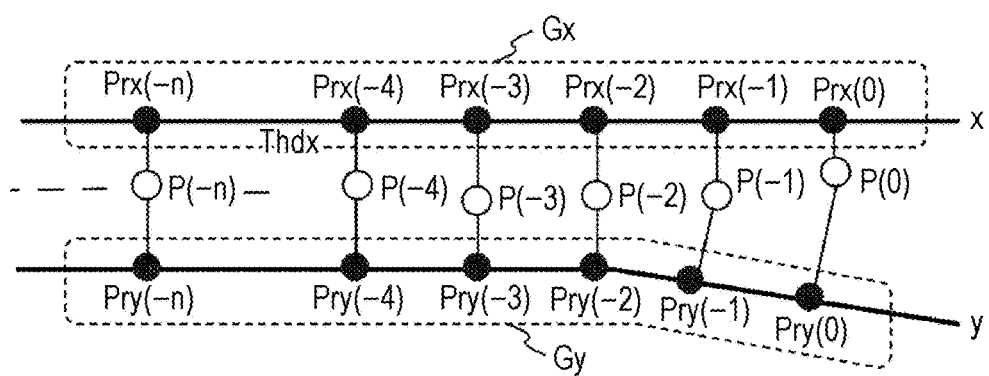

In other words, in a case where, as illustrated in, for example, FIG. 4B, during a time period moving the predetermined distance up to the present, n+1 base locations of P(−n) to P(0) are sequentially calculated, n+1 candidate points of Prx(−n) to Prx(0) are sequentially set on a road x for the respective base locations, and n+1 candidate points of Pry(−n) to Pry(0) are sequentially set on a road y for the respective base locations, the individual candidate points of Prx(−n) to Prx(−1) on the road x form the group of candidate points set on a route leading to the candidate point Prx(0) to be evaluated on the road x during moving the predetermined distance, and the individual candidate points of Pry(−n) to Pry(−1) on the road y form the group of candidate points set on a route leading to the candidate point Pry(0) to be evaluated on the road y during moving the predetermined distance.

Figure 4C:
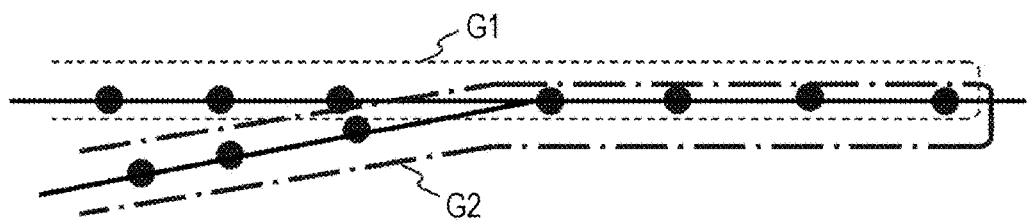

Note that in a case where, as illustrated in FIG. 4C, for one candidate point to be evaluated, groups G1 and G2 may be set as groups of candidate points set on routes leading to the candidate point to be evaluated during moving the predetermined distance, the distance threshold values Thd are calculated for both the two groups, and after that, one of the distance threshold values Thd, whose value is smaller, is calculated as the final distance threshold value Thd.

Next, under the assumption that an average value of the distances d calculated and stored for individual candidate points within a group of previously set candidate points continuously set on a route leading to a candidate point to be evaluated during moving a predetermined distance is Md, a standard deviation of the distances d calculated and stored for individual candidate points within the group of previously set candidate points continuously set on the route leading to the candidate point to be evaluated during moving the predetermined distance is SDd, and an average value of road widths of a road on which the individual candidate points within the group of previously set candidate points continuously set on the route leading to the candidate point to be evaluated during moving the predetermined distance are located is Mw, the distance threshold value Thd is calculated in accordance with the following Expression:

$$Thd = Md + (2 \times SDd) + (MW/2)$$

Note that a running distance is obtained from, for example, a moving distance of the base location.

In addition, in a case where candidate points are not continuously set on the route leading to the candidate point to be evaluated during moving the predetermined distance, in other words, a case where there is a time no candidate point is set on the route leading to the candidate point to be evaluated during moving the predetermined distance, a predetermined value is set as the distance threshold value Thd.

And now, returning to FIG. 3, next, whether the distance d calculated currently in the step 304 is greater than the distance threshold value Thd calculated in the step 306 is checked (step 308). In a case of not being greater than the distance threshold value Thd, a distance viewpoint in-or-out-of-road evaluation value of the candidate point to be evaluated is set as being in the road (step 310). In addition, in a case of being greater than the distance threshold value Thd, the distance viewpoint in-or-out-of-road evaluation value of the candidate point to be evaluated is set as being out of the road (step 312). Note that in a case where the value thereof corresponds to being in the road, the distance viewpoint in-or-out-of-road evaluation value indicates that the candidate point is likely to be a point on the road on which the current location is located. In addition, note that in a case where the value thereof corresponds to being out of the road, the distance viewpoint in-or-out-of-road evaluation value indicates that the candidate point is not a point on the road on which the current location is located.

In addition, next, an azimuth difference θ(0) between the current base azimuth A(0) and an azimuth at the candidate point to be evaluated in the road on which the candidate point to be evaluated is located, illustrated in FIG. 4A, is calculated and stored (step 314).

In addition, a group of previously set candidate points set on the route leading to the candidate point to be evaluated during moving the predetermined distance (for example, 300 m) is calculated, and an azimuth difference threshold value Thθ is calculated from the azimuth difference θ calculated and stored for each of the candidate points within the calculated group (step 316).

Here, under the assumption that an average value of the azimuth differences θ calculated and stored for individual candidate points within a group of previously set candidate points set on the route leading to the candidate point to be evaluated during moving the predetermined distance is Mθ and a standard deviation of the azimuth differences θ calculated and stored for individual candidate points within the group of previously set candidate points set on the route leading to the candidate point to be evaluated during moving the predetermined distance is SDθ, the azimuth difference threshold value Thθ is calculated in accordance with the following Expression:

$$Th\theta = M\theta + (2 \times SD\theta)$$

Note that in a case where candidate points are not continuously set on the route leading to the candidate point to be evaluated during moving the predetermined distance, in other words, a case where there is a time no candidate point is set on the route leading to the candidate point to be evaluated during moving the predetermined distance, a predetermined value is set as the azimuth difference threshold value Thθ.

In addition, in a case where, as illustrated in FIG. 4C, for one candidate point to be evaluated, the groups G1 and G2 may be set as groups of candidate points set on routes leading to the candidate point to be evaluated during moving a predetermined distance, the azimuth difference threshold values Thθ are calculated for both the two groups, and after that, one of the azimuth difference threshold values Thθ, whose value is smaller, is calculated as the final azimuth difference threshold value Thθ.

In addition, whether the azimuth difference θ calculated currently in the step 314 is greater than the azimuth difference threshold value Thθ calculated in the step 316 is checked (step 318). In a case of not being greater than the azimuth difference threshold value Thθ, an azimuth viewpoint in-or-out-of-road evaluation value of the candidate point to be evaluated is set as being in the road (step 320). In addition, in a case of being greater than the azimuth difference threshold value Thθ, the azimuth viewpoint in-or-out-of-road evaluation value of the candidate point to be evaluated is set as being out of the road (step 322).

Here, in a case where the value thereof corresponds to being in the road, the azimuth viewpoint in-or-out-of-road evaluation value indicates that the candidate point is likely to be a point on the road on which the current location is located. In addition, in a case where the value thereof corresponds to being out of the road, the azimuth viewpoint in-or-out-of-road evaluation value indicates that the candidate point is not a point on the road on which the current location is located.

As above, the in-or-out-of-road evaluation value calculation processing is described.

As illustrated in FIG. 5A, in a case where a running velocity changes, spatial intervals at which the base locations and the candidate points are calculated do not become uniform.

Therefore, in the calculation of the group of previously set candidate points set on the route leading to the candidate to be evaluated during moving the predetermined distance in each of the steps 306 and 316 in the above-mentioned in-or-out-of-road evaluation value calculation processing, as illustrated in FIG. 5B, it is desirable to extract the base locations from among the base locations calculated at individual times during a time period of moving the predetermined distance up to the present so that intervals between the current base location P(0) and the extracted base locations (in the drawing, P(−1), P(−2), P(−j), P(−k) . . . ) become approximately constant spatial intervals. And, it is desirable to calculate a group of previously set candidate points so that only the relevant candidate points set for the extracted base locations are included in the group.

Hereinafter, an example of processing of such an in-or-out-of-road evaluation value as described above will be illustrated.

Figure 6:
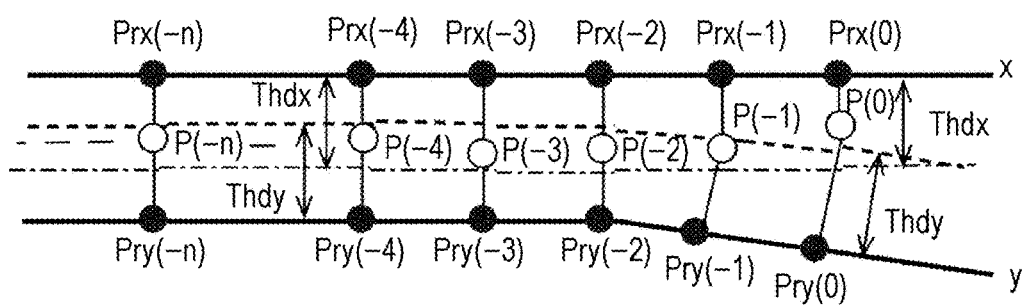
FIG. 6 is a diagram illustrating a processing example of the in-or-out-of-road evaluation value calculation processing according to an embodiment of the present disclosure.

Now, as illustrated in FIG. 6, it is assumed that, up to the present, n+1 base locations of P(−n) to P(0) are calculated, n+1 candidate points of Prx(−n) to Prx(0) are set on the road x for the respective base locations, and n+1 candidate points of Pry(−n) to Pry(0) are set on the road y for the respective base locations.

In this case, with respect to each of the candidate points Prx(i) of Prx(−n) to Prx(0) on the road x, a distance threshold value Thdx is set based on the distances d calculated for individual candidate points Prx set on the road x before the relevant candidate point Prx(i). In addition, in a case where the distance d calculated for the relevant Prx(i) is not larger than the distance threshold value Thdx, the distance viewpoint in-or-out-of-road evaluation value of the candidate point to be evaluated is set as being in the road, and in a case of being larger than the distance threshold value Thdx, the distance viewpoint in-or-out-of-road evaluation value of the candidate point to be evaluated is set as being out of the road.

In addition, with respect to each of the candidate points Pry(i) of Pry(−n) to Pry(0) on the road y, a distance threshold value Thdy is set based on the distances d calculated for individual candidate points Pry set on the road y before the relevant candidate point Pry(i). In addition, in a case where the distance d calculated for the relevant Pry(i) is not larger than the distance threshold value Thdy, the distance viewpoint in-or-out-of-road evaluation value of the candidate point to be evaluated is set as being in the road, and in a case of being larger than the distance threshold value Thdy, the distance viewpoint in-or-out-of-road evaluation value of the candidate point to be evaluated is set as being out of the road.

Here, in a case where a true current location is located on the road x, the distribution of distances between the base locations and the road x follows a normal distribution in which 95% of values are distributed in a range equivalent to twice an average value± a standard deviation. Therefore, nearly all the distances d calculated for the respective candidate points on the road x become smaller than the distance threshold values Thdx calculated for the respective candidate points on the road x.

On the other hand, in a case where the true current location is located on the road x, the distribution of distances between the base locations and the road y does not follows a normal distribution. Therefore, as illustrated in the drawing, the distances d calculated for the respective candidate points on the road y become larger than the distance threshold values Thdy in association with an increase in a distance between the road x in which the true current location is located and the road y.

Therefore, in a case of using such a distance threshold value Thd, it is possible to adequately judge whether or not the current location is a location out of the road in which a calculated candidate point is located.

Figure 7A:
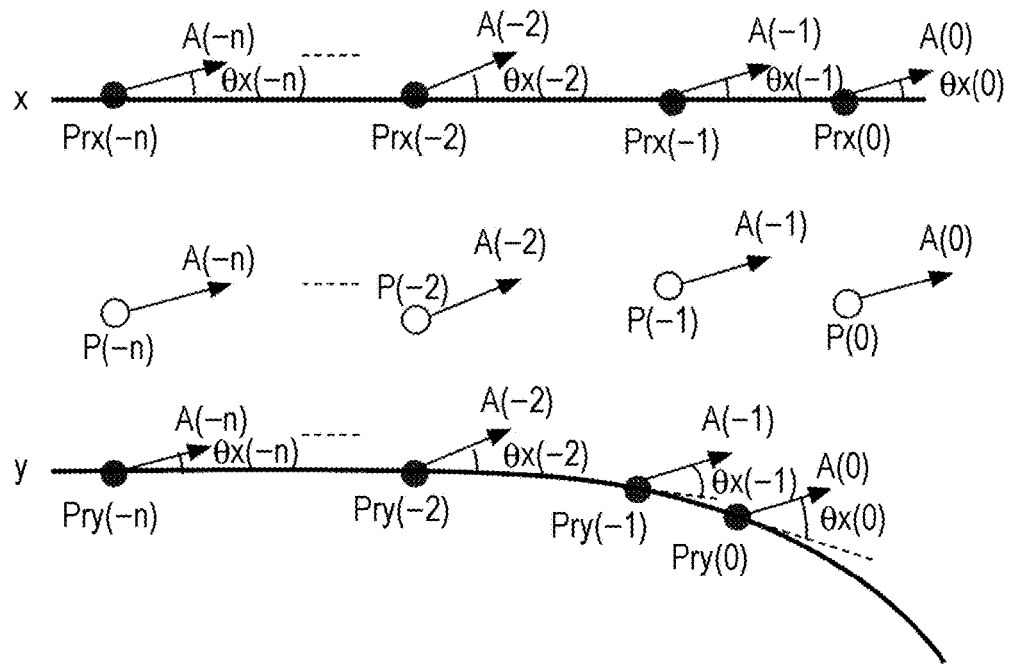
FIGS. 7A and 7B are diagrams each illustrating a processing example of the in-or-out-of-road evaluation value calculation processing according to an embodiment of the present disclosure.

Next, as illustrated in FIG. 7A, it is assumed that, up to the present, the n+1 base locations of P(−n) to P(0) and n+1 base azimuths of A(−n) to A(0) are calculated, the n+1 candidate points of Prx(−n) to Prx(0) are set on the road x for the respective base locations, and the n+1 candidate points of Pry(−n) to Pry(0) are set on the road y for the respective base locations.

In this case, with respect to each of the candidate points Prx(i) of Prx(−n) to Prx(0) on the road x, an azimuth difference threshold value Thθx is set based on azimuth differences θx calculated for individual candidate points Prx set on the road x before the relevant candidate point Prx(i). In addition, in a case where the azimuth difference θx(i) calculated for the relevant Prx(i) is not larger than the azimuth difference threshold value Thθx, the azimuth viewpoint in-or-out-of-road evaluation value of the candidate point to be evaluated is set as being in the road, and in a case of being larger than the azimuth difference threshold value Thθx, the azimuth viewpoint in-or-out-of-road evaluation value of the candidate point to be evaluated is set as being out of the road.

In addition, with respect to each of the candidate points Pry(i) of Pry(−n) to Pry(0) on the road y, an azimuth difference threshold value Thθy is set based on azimuth differences θy calculated for individual candidate points Pry set on the road y before the relevant candidate point Pry(i). In addition, in a case where the azimuth difference θy(i) calculated for the relevant Pry(i) is not larger than the azimuth difference threshold value Thθy, the azimuth viewpoint in-or-out-of-road evaluation value of the candidate point to be evaluated is set as being in the road, and in a case of being larger than the azimuth difference threshold value Thθy, the azimuth viewpoint in-or-out-of-road evaluation value of the candidate point to be evaluated is set as being out of the road.

Figure 7B:
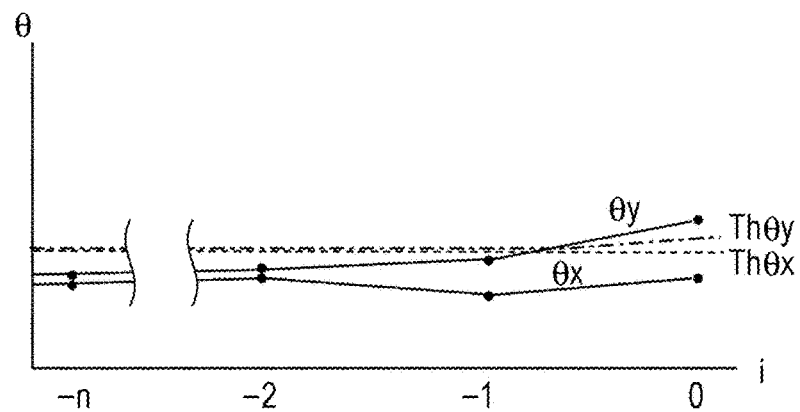

Here, in a case where a true current location is located on the road x, the distribution of azimuth differences between the base azimuths and azimuths of the road x at the candidate points on the road x follows a normal distribution in which 95% of values are distributed in a range equivalent to twice an average value± a standard deviation. Therefore, as illustrated in FIG. 7B, nearly all the azimuth differences θx calculated for the respective candidate points on the road x become smaller than the azimuth difference threshold values Thθx calculated for the respective candidate points on the road x.

On the other hand, in a case where the true current location is located on the road x, the distribution of azimuth differences between the base azimuths and azimuths of the road y at the candidate points on the road y does not follows a normal distribution. Therefore, as illustrated in FIG. 7B, the azimuth differences θy calculated for the respective candidate points on the road y become larger than the azimuth difference threshold values Thθy in association with an increase in an azimuth difference between the azimuth of the road x at the true current location and the azimuth of the road y at the corresponding candidate point on the road y.

Therefore, in a case of using such an azimuth difference threshold value Thθ, it is possible to adequately judge whether or not the current location is a location out of the road in which a calculated candidate point is located.

As above, an embodiment of the present disclosure is described.

Note that, in the above description, the distance viewpoint in-or-out-of-road evaluation value and the azimuth viewpoint in-or-out-of-road evaluation value are used for judging whether or not the current location is located on the road on which the candidate point is located. An arbitrary evaluation value indicating a magnitude of a correlation between the base location and the corresponding candidate point or a magnitude of a correlation between the base azimuth and the azimuth of the road at the corresponding candidate point may be used for judging whether or not the current location is located on the road on which the candidate point is located.

Note that while the above-mentioned embodiment is described by taking, as an example, application to the mobile device 1, the operation and the configuration of the navigation application 102 in the present embodiment is applicable to the operation and the configuration of a car-mounted navigation device. In addition, in this case, the calculation of the above-mentioned base location and base azimuth in the car-mounted navigation device may be performed by the dead reckoning navigation based on a gyroscopic sensor, an acceleration sensor, and a vehicle speed sensor mounted in an automobile.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teaching of the invention without departing from the central scope thereof. Therefore, it is intended that this invention not be limited to the particular embodiments disclosed, but that the invention will include all embodiments falling within the scope of the appended claims.

What is claimed is:

1. A navigation device that measures a location of the device itself, the navigation device comprising:
   a processor for executing a plurality of units, the plurality of units comprising:
      a referenced-point setting unit configured to repeatedly perform processing for i) setting, as a base location, a current location of the navigation device measured by GPS or a sensor, ii) referencing map data expressing a map from a storage unit, and iii) setting, as a referenced point, a point located on a road in the vicinity of the base location and near to the base location; and
      an out-of-road determination unit configured to determine, each time the referenced point is set, whether a current location is located out of the road in which the referenced point is set,
   wherein the out-of-road determination unit:
      a) calculates, each time the referenced point is set, an evaluation target correlation value indicating a magnitude of a correlation between the current base location and the current referenced point;
      b) defines, as a focused referenced point, each of the previously set referenced points in which a trajectory obtained by connecting the previously set referenced points and the current referenced point in order of setting of the referenced points follows the trajectory on the road leading to the current referenced point;
      c) statistically obtains, from a history of evaluation target correlation values individually calculated for the respective focused referenced points, a value of a boundary of a distribution range including most of the evaluation target correlation values under an assumption that the evaluation target correlation values within the history are distributed in accordance with a predetermined distribution model;
      d) sets the obtained value of the boundary as a threshold value and determines whether the evaluation target correlation value calculated for the current referenced point shows a correlation smaller than the threshold value;
      e) determines that the current location is located out of the road in which the current referenced point is set, in a case of showing smaller correlation; and
      f) does not determine that the current location is located out of the road in which the current referenced point is set, in a case of not showing smaller correlation.

2. The navigation device according to claim 1, wherein a distance between the current base location and the current referenced point is used as the evaluation target correlation value.

3. The navigation device according to claim 1, wherein a referenced point set during a time period in which the navigation device previously moved a predetermined distance is defined as the focused referenced point, from among previously set referenced points in which the trajectory obtained by connecting the previously set referenced points and the current referenced point in order of setting of the referenced points follows the trajectory on the road leading to the current referenced point.

4. The navigation device according to claim 1, wherein the measured location of the navigation device is a location of the navigation device, measured by a GPS receiver.

* * * * *